United States Patent
Kwok et al.

(10) Patent No.: US 12,045,847 B2
(45) Date of Patent: Jul. 23, 2024

(54) PREDICTIONS BASED ON ANALYSIS OF BIG DATA

(71) Applicant: Capital One Services, LLC, McLean, VA (US)

(72) Inventors: Jennifer Kwok, New York, NY (US); Viraj Chaudhary, Katy, TX (US); Cruz Vargas, Denver, CO (US)

(73) Assignee: Capital One Services, LLC, McLean, VA (US)

(*) Notice: Subject to any disclaimer, the term of this patent is extended or adjusted under 35 U.S.C. 154(b) by 256 days.

(21) Appl. No.: 17/191,058

(22) Filed: Mar. 3, 2021

(65) Prior Publication Data
US 2022/0284459 A1   Sep. 8, 2022

(51) Int. Cl.
*G06Q 30/02* (2023.01)
*G06N 20/00* (2019.01)
*G06Q 30/0201* (2023.01)

(52) U.S. Cl.
CPC ......... *G06Q 30/0206* (2013.01); *G06N 20/00* (2019.01); *G06Q 30/0201* (2013.01)

(58) Field of Classification Search
CPC ........... G06Q 30/0206; G06Q 30/0201; G06Q 30/0254; G06Q 10/067; G06Q 30/0246; G06Q 30/02; G06Q 30/0207; G06N 20/00
See application file for complete search history.

(56) References Cited

U.S. PATENT DOCUMENTS 9,916,538 B2 * 3/2018 Zadeh ................... A61B 5/7221
10,157,352 B1 * 12/2018 Chan ...................... G06N 5/047
(Continued)

FOREIGN PATENT DOCUMENTS

| CA | 3061065 A1 | * | 5/2020 | ............... G06F 8/60 |
| CN | 101060566 A | * | 10/2007 | ............. H04M 3/42 |
| CN | 101686249 A | * | 3/2010 | ............. H04L 29/08 |

OTHER PUBLICATIONS

Perset, K. (2010), "The Economic and Social Role of Internet Intermediaries", OECD Digital Economy Papers, No. 171, OECD Publishing, Paris, retrieved: Dec. 14, 2022 link: https://doi.org/10.1787/5kmh79zzs8vb-en. (Year: 2010).*

Herrera, Francisco. (2015). "Data Mining Methods for Big Data Preprocessing" Retrieved Dec. 17, 2022 from <<https://sci2s.ugr.es/sites/default/files/files/TematicWebSites/BigData/Summer-School-Big%20Data%20preprocessing%20-%20Benicassim.pdf>> (Year: 2015).*

(Continued)

*Primary Examiner* — Marilyn G Macasiano
(74) *Attorney, Agent, or Firm* — Banner & Witcoff, Ltd.

(57) ABSTRACT

Systems as described herein may analyze big data to generate predictions for Software-as-a-Service (SaaS) offerings and/or other subscription-based software. A prediction system may receive small business transaction data comprising payment information between a plurality of merchants and a software vendor. The prediction system may receive enterprise merchant insights information. The prediction system may identify, based on the small business transaction data and the enterprise merchant insights information, recurring transactions using a first machine learning model. The prediction system may generate an average contract price and a confidence score, using a second machine learning model. The prediction system may generate a recommendation comprising a renewal rate. Based on a determination that a service provided by the software vendor is coming due for renewal, the prediction system may send, to a particular merchant, an alert associated with the renewal and the recommendation.

21 Claims, 4 Drawing Sheets

(56) References Cited

U.S. PATENT DOCUMENTS

| | | | |
|---|---|---|---|
| 10,713,692 B2 | 7/2020 | Xie et al. | |
| 10,817,568 B2 | 10/2020 | Alzate Perez et al. | |
| 10,839,207 B2 | 11/2020 | Wood et al. | |
| 10,852,150 B2 | 12/2020 | Li et al. | |
| 2016/0092557 A1* | 3/2016 | Stojanovic | G06F 16/248 |
| | | | 707/723 |
| 2019/0318367 A1* | 10/2019 | Myles | G06Q 10/0637 |
| 2020/0202379 A1* | 6/2020 | Yacoub | G06Q 30/0222 |

OTHER PUBLICATIONS

Author(s): Rautio Title:SAAS using machine learning. Journal: Tuni [online]. Publication date: 2019. [retrieved on: Sep. 1, 2023 ]. Retrieved from the Internet: < URL: https://trepo.tuni.fi/bitstream/handle/123456789/27579/Rautio.pdf?sequence=4> (Year: 2019).*
Subscription-Based product price optimization, an IP.com Prior Art Database Technical Disclosure, Feb. 18, 2019 (Year: 2019).*
Methods to effectively manage cloud subscriptions promoting regular renewals before expiration data, an IP.com Prior Art Database technical Disclosure, Aug. 31, 2017 (Year: 2017).*

* cited by examiner

PREDICTIONS BASED ON ANALYSIS OF BIG DATA

FIELD OF USE

Aspects of the disclosure relate generally to big data and more specifically to the processing and management of big data.

BACKGROUND

A server may receive data associated with a plurality of accounts. At least one of the plurality of accounts may interact with one or more servers that provide software as a service (SaaS). The plurality of accounts may not have ample computing resources to monitor their actual usages of the SaaS services and to predict future usage of their SaaS services over time. As a result, the plurality of accounts may lack adequate knowledge to make informed decisions when renewing their SaaS offerings. Conventional servers and/or accounts may fail to establish a knowledge base related to the SaaS offerings and other subscription-based services, thereby limiting their ability to renew their SaaS offerings and/or other subscription-based services on better terms.

Aspects described herein may address these and other problems, and generally improve the quality, efficiency, and speed of processing big data to predict terms of their SaaS offerings and/or other subscription-based software.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Systems as described herein may include features for analyzing big data to better predict terms for a Software-as-a-Service (SaaS) offering and/or other subscription-based software. A server may receive data comprising information between a plurality of accounts and a software vendor that provides a SaaS offering and/or other subscription-based software. The server may also receive enterprise insights information. The server may identify, based on the data and the enterprise insights information, recurring transactions associated with a purchase of a SaaS offering and/or other subscription-based software service, using a first machine learning model. The server may generate, based on the recurring transactions, an average contract price associated with a first service of the SaaS offering and/or other subscription-based software service using a second machine learning model. The server may also generate a confidence score associated with the average contract price. The server may generate, based on the average contract price and the confidence score exceeding a threshold value, a recommendation comprising a renewal term. Based on a determination that the first service provided by the software vendor is coming due for renewal, the server may send an alert associated with the renewal. The alert may comprise the recommendation.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

Figure 1:
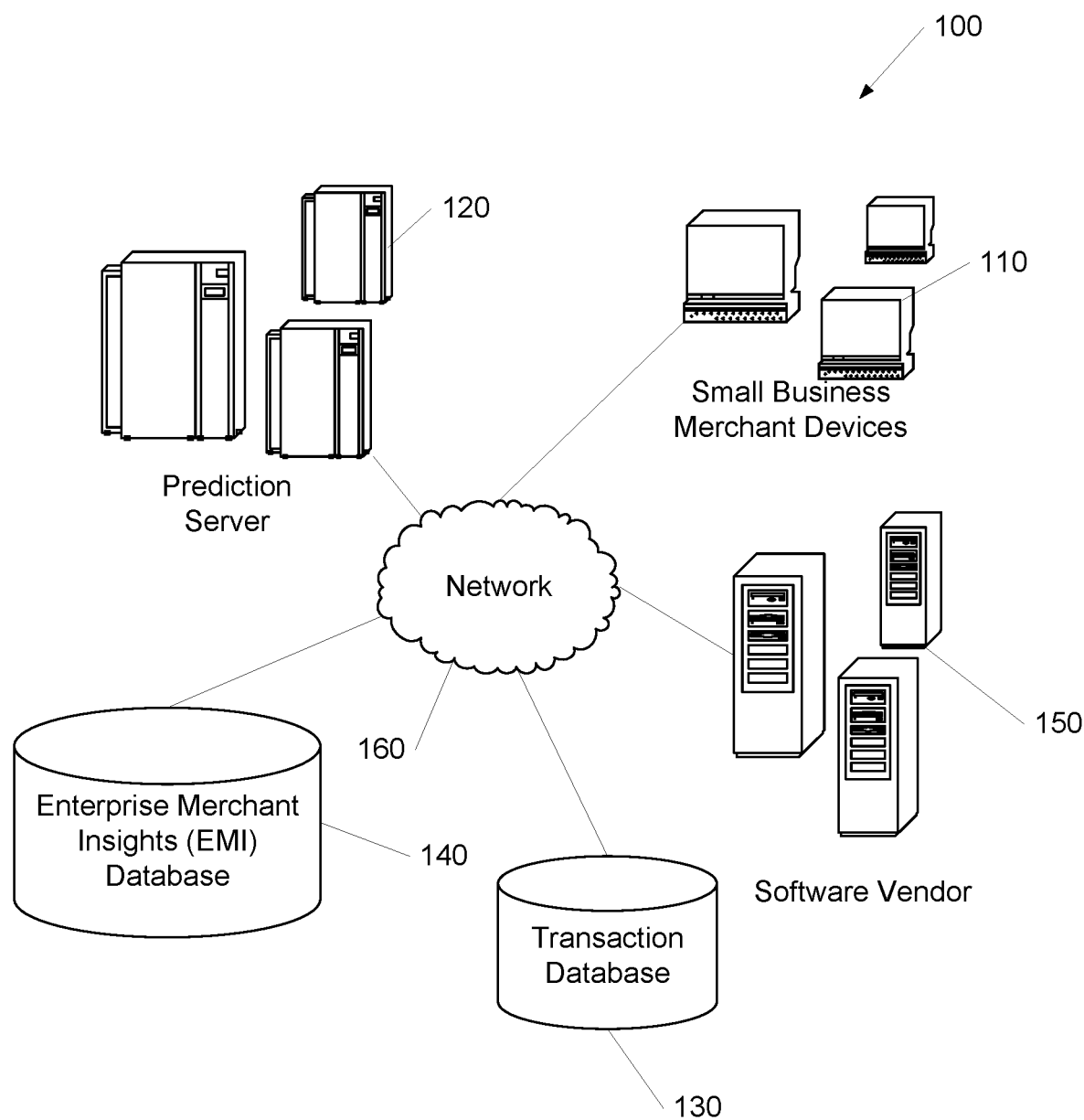
FIG. 1 shows an example of a system for analyzing big data to generate predictions for Software-as-a-Service (SaaS) offerings and/or other subscription-based software in which one or more aspects described herein may be implemented.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for analyzing big data to predict renewal terms for Software-as-a-Service (SaaS) offerings and/or other subscription-based software. A server (e.g., a prediction system executing on a server) may receive, from a particular merchant, an input, such as a contract term length, a type of service, a merchant size, etc. The server may generate a recommendation, for example, based on the contract term length. The server may receive small business transaction data in a first data format, such as a text format. The server may also receive enterprise merchant insights information in a second data format, such as an unstructured data format. Alternatively, the first data format may comprise unstructured data format, and the second data format may comprise a text format. Conversely, the server may convert the small business transaction data and the enterprise merchant insights information into a common format.

The server may use a first machine learning model and/or a second machine learning model to analyze the big data. The first machine learning model and/or the second machine learning model may comprise a supervised machine learning model and/or an unsupervised machine learning model. The server may train a first machine learning model to adjust a weight associated with each of a plurality of input factors. The server may train a second machine learning model to adjust a weight associated with each of a plurality of prediction factors.

The server may predict, using the second machine learning model, a growth rate in the average contract price associated with the first service. The server may also generate a recommendation for one or more renewal terms, for example, based on the average contract price, the contract size, contract scope, and/or the predicted growth rate. The one or more renewal terms may comprise a renewal rate, a term of the renewal, an invoice schedule, etc.

The server may collect training data from small business merchant devices. The training data may include prediction factors to be used as model inputs to the second machine learning model. The server may train the second machine learning model, for example, by adjusting a weight associated with each of the prediction factors. After the second machine learning model has been trained, the server may use the second machine learning model to generate a plurality of terms (e.g., prices, renewal rates, term of the contract, an invoice schedule, etc.). The prediction factors may include, for example, merchant factors, such as a merchant size, a merchant location, a merchant industry, and the like. Similarly, transaction factors may include transaction information, such as a transaction amount and/or a frequency of payments (e.g., monthly, quarterly, bi-annually, annually, etc.). Lastly, vendor factors may comprise a vendor size, a vendor location, a type of software-based service, etc.

Prediction Systems Based on Analysis of Big Data

FIG. 1 shows a prediction system 100. The prediction system 100 may include at least one or more small business merchant devices 110, at least one prediction server 120, at least one transaction record database 130, and/or at least one enterprise merchant insights (EMI) database 140, and/or at least one software vendor 150 interconnected via a network 160. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 2.

The one or more small business merchant devices 110 may submit transaction information related to a transaction. The transaction information may comprise a merchant identifier, a transaction amount, merchant information, a transaction timestamp, and the like. The one or small business merchant devices 110 may receive an alert indicating a service provided by a software vendor is coming due for renewal and/or a recommendation on a renewal term (e.g., rate, length of contract, invoice schedule, etc.). The one or more small business merchant devices 110 may send requests for authorization for recurring transactions for payment of subscription-based software services. Such authorization requests may be sent to an authorization server (not shown), which may be a component of prediction server 120 or may be a system independent from prediction server 120 as illustrated in FIG. 1.

Prediction servers 120 may receive transaction data from the one or more small business merchant devices 110. The transaction data may comprise payment information between the one or more small business merchant devices 110 and a software vendor 150, such as a SaaS vendor. The software vendor may host web-based, or on-demand software that may provide one or more applications (e.g., executables, software) via a cloud computing environment, so that the one or more applications may be licensed on a subscription basis. Software vendor 150 may provide various types of services, such as SaaS, infrastructure as a service (IaaS), platform as a service (PaaS), desktop as a service (DaaS), managed software as a service (MSaaS), mobile backend as a service (MBaaS), datacenter as a service (DCaaS), and/or information technology management as a service (ITMaaS). Software vendor 150 may also provide the software services in connection with other subscription-based services, such as an Internet service, a content delivery service or a weather forecast service. These services may be subject to various contract negotiations.

Prediction servers 120 may send an alert to the one or more small business merchant devices 110. The alert may indicate that a service provided by software vendor 150 is coming due for renewal. The alert may also comprise a recommendation on a renewal term (e.g., rate, length of contract, invoice schedule, etc.). Prediction servers 120 may monitor payment schedules for the one or more small business merchants 110, for example, based on their recurring payments. Prediction servers 120 may provide the one or more small business merchants 110 with one or more points of reference in contract negotiations, for example, based on other similar merchants who previously negotiated with the same vendor. Prediction servers 120 may provide a particular small business merchant with information on reasonable terms, such as renewal rates and other contractual terms, which may be supported by big data collected from numerous other merchants.

Transaction database 130 may store transaction records related to transactions previously conducted by users in transaction streams from a plurality of small business merchants. Transaction database 130 may receive a request from prediction server 120 and/or retrieve the corresponding transaction records in the transaction streams. The transaction records may each contain an account identifier, a transaction amount, a transaction time, a merchant identifier, etc. Transaction database 130 may store transaction records associated with recurrent payments from the one or more small business merchants 110 in various industries for various types of subscription-based services. The transaction information may be gathered in a text format or unstructured format, and later converted into a common format.

Enterprise merchant insights (EMI) database 140 may store merchant records related to the one or more small business merchants 110. Enterprise merchant insights database 140 may be a merchant database that stores enterprise merchant insights records, which may in turn include a merchant identifier, a friendly merchant name, a zip code, a physical address, a phone number, an email or other contact information of the merchants, and/or a merchant category code (MCC). A MCC may be a four-digit number listed in ISO 18245 for retail financial services and used to classify a business by the types of goods or services it provides. MCCs may be assigned either by merchant type (e.g., one for hotels, one for office supply stores, etc.) or by merchant name. For example, Wal-Mart Supercenters may be classified as MCC No. 5411, "Grocery stores/supermarkets/bakeries," while standard Wal-Marts (without groceries) may be classified as 5310, "discount stores/warehouse/wholesale." The merchant records may be collected from public resources and/or merchant reported records.

In a variety of embodiments, a financial institution may build a proprietary EMI database 140, for example, based on an aggregation of transaction records in transaction database 130. As a transaction arrives from a transaction stream, the corresponding transaction record may be processed, normalized, and/or enhanced with a variety of services. For example, when a financial institution receives the transaction information in a transaction stream, the transaction information may be in the form of a line of data that offers limited information about the transaction, with each piece of information appearing in certain locations within the line of data. The merchant identifier may appear in a specific location and/or may include 8-10 characters in the abbreviated form, which may not be readily recognizable as a meaningful merchant name, particularly for small business merchants. The financial institution may process this abbreviated merchant identifier and convert it into a meaningful merchant name in a human readable format, and store it in EMI database 140.

In a variety of embodiments, a financial institution may use a third-party API to gather merchant information, such as a merchant address or contact information, to be stored in EMI database 140. In a variety of embodiments, a financial organization may maintain more static merchant information, such as a merchant identifier and MCC, in its proprietary EMI database 140. The financial institution may use the third-party API to get merchant address, merchant social media handle, and/or other merchant information that may change over time. The merchant information may be gathered in a text format or unstructured format and later converted into a common format.

Prediction servers 120 may receive enterprise merchant insights information associated with the one or more small business merchants 110 from EMI database 140. The enterprise merchant insights information may comprise a merchant category code for each of the one or more small business merchants 110. Prediction servers 120 may also determine one or more industries of one or more small business merchants 110, for example, based on the merchant category code.

Based on the small business transaction data and the enterprise merchant insights information, prediction server 120 may use a first machine learning model to identify recurring transactions associated with a purchase of one or more services from the software vendor. After identifying these recurring transactions, prediction server 120 may use a second machine learning model to generate an average contractual term (e.g., price, renewal rate, length of contract, etc.) associated with a first service of the one or more services provided by the software vendor. Additionally or alternatively, the prediction servers 120 may use the second machine learning model to generate a confidence score associated with the average contractual term. Upon a determination that the confidence score exceeds a threshold value, prediction server 120 may generate a recommendation comprising a renewal term based on the average contractual term. For example, the recommendation may comprise a renewal rate based on the average contract price.

Prediction servers 120 may send an alert for the renewal of one or more services to the one or more small business merchant devices 110. The alert may comprise the recommendation. Prediction servers 120 may send an alert that a service provided by the software vendor is coming due for renewal. Additionally or alternatively, prediction servers 120 may suggest the recommended renewal rate and other contract terms to a small business merchant.

The one or more small business merchant devices 110, prediction server 120, transaction record database 130, EMI database 140, and/or software vendor 150 may be associated with a particular authentication session. Prediction servers 120 may receive, process, and/or store a variety of transaction records and enterprise merchant insights information, and/or receive transaction records with the one or more small business merchant devices 110 as described herein. However, it should be noted that any device in prediction system 100 may perform any of the processes and/or store any data as described herein. Some or all of the data described herein may be stored using one or more databases. Databases may include, but are not limited to relational databases, hierarchical databases, distributed databases, in-memory databases, flat file databases, XML databases, NoSQL databases, graph databases, and/or a combination thereof. The network 160 may include a local area network (LAN), a wide area network (WAN), a wireless telecommunications network, and/or any other communication network or combination thereof.

The data transferred to and from various computing devices in prediction system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. A file-based integration scheme or a service-based integration scheme may be utilized for transmitting data between the various computing devices. Data may be transmitted using various network communication protocols. Secure data transmission protocols and/or encryption may be used in file transfers to protect the integrity of the data such as, but not limited to, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the data sharing system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, and/or firewalls. Such specialized hardware may be installed and configured in the prediction system 100 in front of one or more computing devices such that any external devices may communicate directly with the specialized hardware.

Computing Devices

Figure 2:
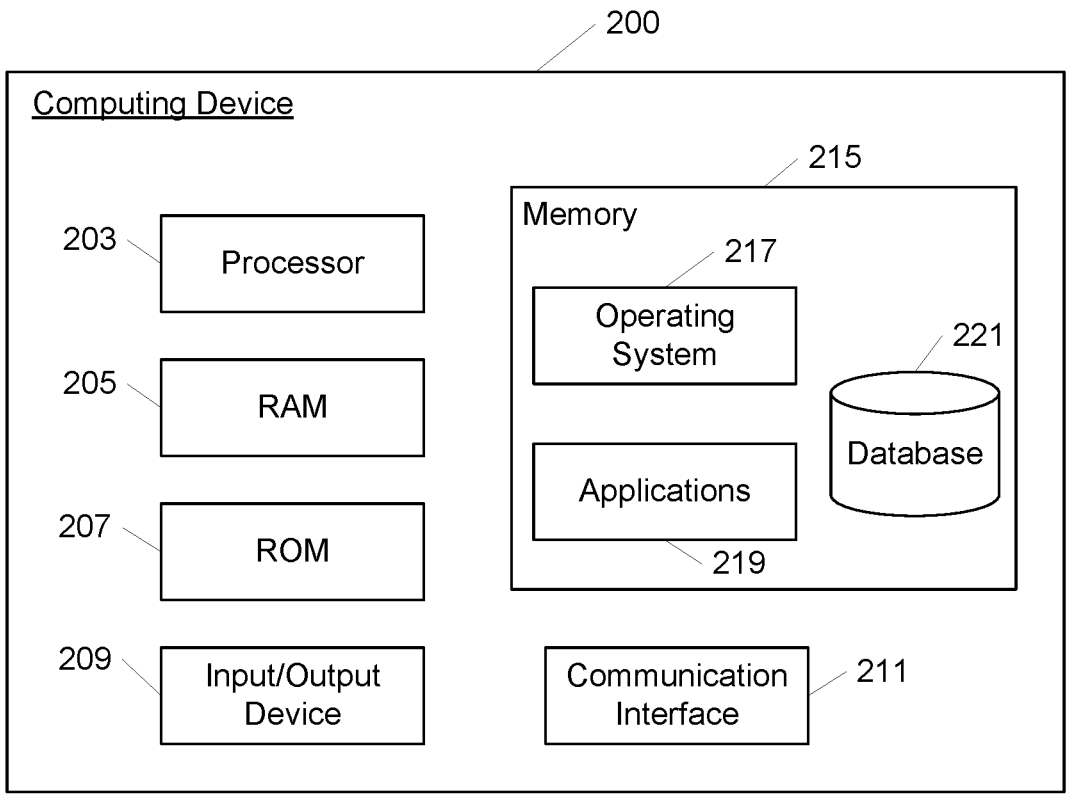
FIG. 2 shows an example computing device in accordance with one or more aspects described herein.

Turning now to FIG. 2, a computing device 200 that may be used with one or more of the computational systems is described. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. Memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches including, but not limited to, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Analyzing Big Data to Predict Terms for Subscription-Based Software Renewal

A server (e.g., a prediction system executing on a server) may collect transaction information and business insights related to tens of thousands of small business merchants. The prediction system may use machine learning model to identify recurring payments and/or determine an average contractual term (e.g., price) for a service provided by a software vendor. Rather than relying on the small business merchants to spend enormous computing resources to keep track of actual or projected usage of the software-based service, the prediction system may provide reference points to small business merchants to facilitate their contract negotiations with the vendor.

Figure 3:
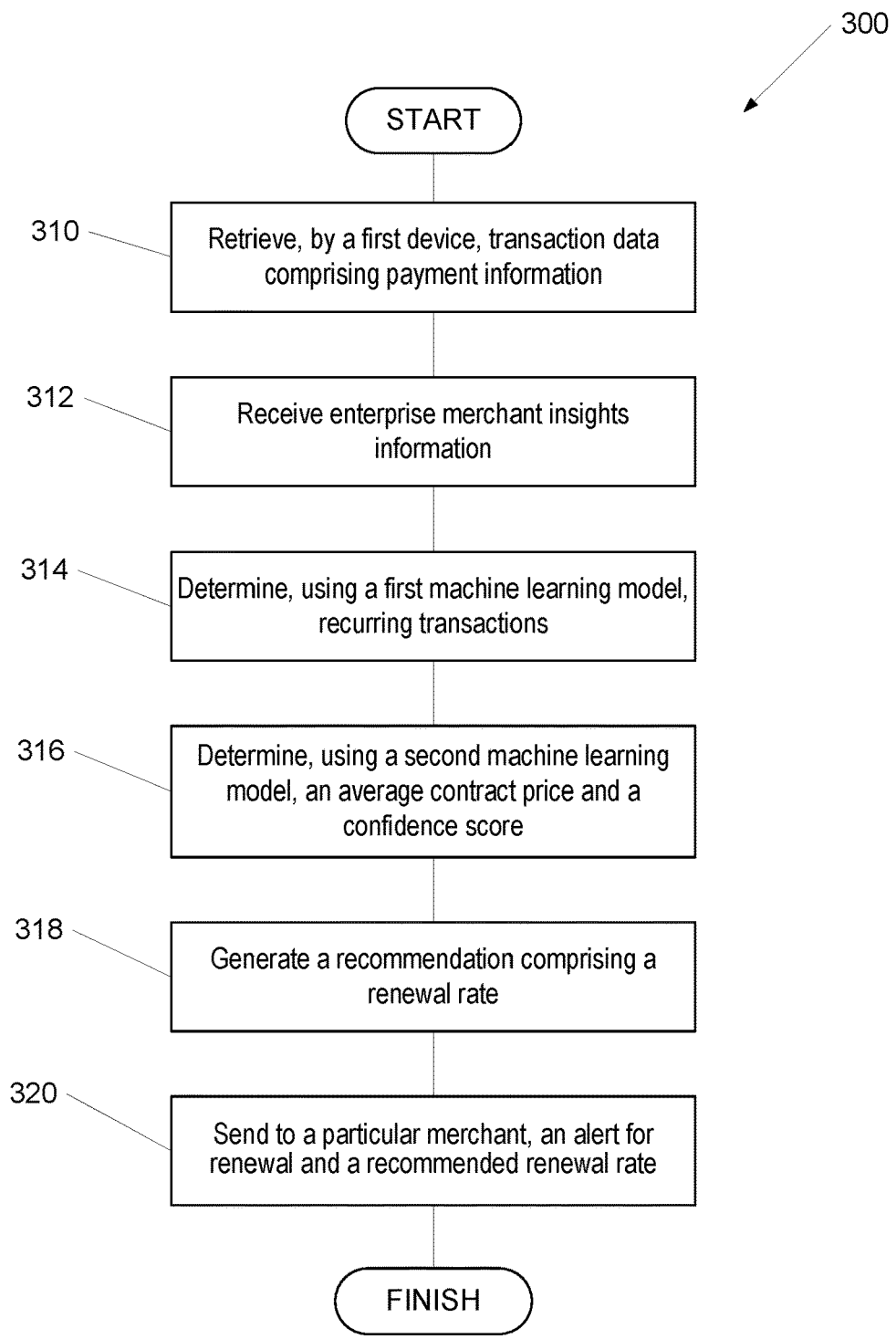
FIG. 3 shows a flow chart of a process for analyzing big data to predict terms for renewing SaaS offerings and/or other subscription-based software according to one or more aspects of the disclosure.

FIG. 3 shows a flow chart of a process for analyzing big data to predict terms for renewing Software-as-a-Service (SaaS) offerings and/or other subscription-based software according to one or more aspects of the disclosure. Some or all of the steps of process 300 may be performed using one or more computing devices as described herein.

At step 310, a first device may receive transaction data comprising payment information between a plurality of merchants and a software vendor. The first device, such as a prediction server may receive transaction data from a transaction database which may store records of previously conducted transactions. The transaction records may each contain an account identifier, a transaction amount, a transaction time, a merchant identifier of the merchant that was making the payment, the vendor that received the payment, etc. A database, such as transaction database 130 discussed above, may store transaction records associated with recurrent payments from small business merchants in various industries for various types of subscription-based services.

In a variety of embodiments, the software vendor, such as a SaaS vendor, may host web-based or on-demand software that may provide a software license and deliver an application via the Internet so that the software may be licensed on a subscription basis. For example, the SaaS vendor may price its services using a subscription fee, for example, a monthly fee, a quarterly fee, or an annual fee. In some examples, the initial setup cost for SaaS may be lower than the equivalent enterprise software and SaaS vendors may price their services based on some usage parameters, such as the number of users using the services. Given that in a SaaS environment, customers' data reside with the SaaS vendor, the SaaS vendor may also charge the customers on a per transaction basis, a per event basis, or other units of value, such as the number of processors used and/or the amount of processing time. The SaaS vendor may also make a free service available with limited functionality or scope, and fees are charged incrementally for enhanced functionality and/or expanded scope.

Small business merchants may not have the resources to deal with the complex pricing schemes to engage in effective contract negotiations. For example, small business merchants may not have the visibility to the usage parameters and may not have the computing resources to track the usage based on these usage parameters. Small business merchants also may not have the ability to predict and/or forecast future usage over time. As a result, small business merchants may have limited knowledge to make informed decisions in contract negotiations with the vendors.

A financial institution may have access to previously conducted transaction records between merchants and vendors, which may offer insights to their customers, particularly small business merchants, to have a point of reference on reasonable contract terms, based on other merchants who previously negotiated with the same vendor. For example, a prediction server may receive contractual information, including transaction information, from numerous merchants who have made recurring payments to a software vendor, such as Salesforce®. Prediction server may select the transaction information corresponding to these recurring payments for further processing.

In a variety of embodiments, when a financial institution receives the transaction information in a transaction stream, the transaction information may be in the form of a line of data that offers limited information about the transaction, with each piece of information appearing in certain locations within the line of data. This line of data may be collected in a text format and converted into a common format, such as a JavaScript Object Notation (JSON) format or an Extensible Markup Language (XML) format. The financial institution may also have access to transaction information in the form of unstructured data such as the body of an e-mail message, Web page, or word-processor document that may contain details of the contract or license agreement corresponding to the recurring payments. Such transaction information in unstructured format may be collected and subsequently converted into the common format.

At step 312, the first device may receive enterprise merchant insights information. For example, the first device, such as a prediction server, may receive enterprise merchant insights information associated with the small business merchants making recurring payments to the software vendor. The enterprise merchant insights information may include a merchant category or an industry for each of small business merchants. In a variety of embodiments, enterprise merchant insights information may be retrieved from a database, such as EMI database 140, where a merchant record in the EMI database may contain a small business merchant identifier, a friendly or human readable merchant name, merchant contact information, and/or Merchant Category Code (MCC) indicating an industry that the merchant belongs to. For example, a first small business merchant in e-commerce may make a monthly payment of X amount to a software vendor, a second small business merchant in manufacturing may make a monthly payment of Y amount to the software vendor, while a third small business merchant in healthcare may make a quarterly payment of Z amount to the software vendor. The prediction server may further have information on the software vendor, the types of services provided by the vendor, name and logo of the vendor, and/or the size of the business. The prediction server may categorize the small business merchants associated with the recurring payments based on, for example, the type of services provided by the vendor, and the size of the business. This categorization information may be used in determining whether the relevant payments may correspond to payments for a SaaS vendor in step 314.

In a variety of embodiments, enterprise merchant insights information may be retrieved as unstructured data from various sources, which may include books, journals, documents, metadata, health records, audio, video, analog data, images, files, or the like. Enterprise merchant insights information may also be stored as unstructured text, such as the body of an e-mail message, Web page, or word-processor document. For example, prediction server, such as prediction server 120, may extract content and/or data from a merchant website automatically using a bot, web scraper, etc. Prediction server 120 may access the merchant website using the Hypertext Transfer Protocol (HTTP), or through a web browser. Prediction server 120 may copy and/or collect unstructured data in a text format from the web, convert the merchant data into a common format, such as a JSON format or an XML format. Prediction server 120 may store the merchant information in EMI database 140 for later retrieval and/or analysis.

At step 314, recurring transactions associated with a purchase of one or more services from the software vendor may be identified using a first machine learning model. The purchase of the one or more services may be based on the small business transaction data and/or the enterprise merchant insights information. For example, a prediction server may have visibility to millions of transactions from thousands of vendors. The prediction server may determine whether certain transactions may be related to subscription-based services with the vendors, such as SaaS vendors. The prediction server may compare certain recurring transactions with other transactions that occurred within a predetermined timeframe to identify a trend. The timeframe may be, for example, the past two to three years. The prediction server may compare certain recurring transactions with transactions originating from merchants of similar size and/or in the same, or similar, merchant category or industries. Additionally or alternatively, the prediction server may identify purchases for the same, or similar, types of services.

In a variety of embodiments, the first machine learning model may be a supervised machine learning model. For example, a financial institution may partner with certain small business merchant customers and ask them to label certain transactions as payments to subscription-based services to vendors, such as Salesforce®. As such, the prediction server may extrapolate a small set of transactions to a larger set of transactions with other vendors. The labeled data set may be used as a training data set for the first machine learning model. The first machine learning model may also be a supervised machine learning model accepting inputs from the small business merchants, such as labels, contract prices, contract durations or terms, the specific types of services, price sensitivity on how much a merchant may be willing to pay for the services, merchant sizes, etc. The small business merchants may provide inputs primarily on transaction data related to payments to previously conducted transactions. The small business merchants may also provide additional merchant related information to enrich the transaction data.

In a variety of embodiments, the prediction server may use certain factors as inputs for the first machine learning model, such as timeframes of recurring transactions, transaction amounts similar to the labeled recurring payments, etc. For example, the first machine learning model may use recurring transactions that occur around the similar timeframes when the labeled recurring payments to SaaS vendors occur. The first machine learning model may use recurring transactions that have similar transaction amounts with the labeled recurring payments to SaaS vendors. The prediction server may also use other factors as inputs for the first machine learning model, such as the industries that the small business merchants belong to, types of goods the small business merchants may be selling or types of services that the small business merchants purchased from the vendors, etc. The first machine learning model may be tuned to adjust weights on the input factors. For example, if a small business merchant is in the e-commerce space, SaaS services related to inventory, shipping, and marketing may be relevant to the merchant. A higher weight may be assigned to the types of SaaS services related to inventory, shipping, and marketing than other types of SaaS services. If a small business merchant is in an industry that has no physical goods, SaaS services related to inventory and shipping may not be relevant. A lower weight may be assigned to the types of SaaS services related to inventory and shipping than a weight for a service related to marketing.

The first machine learning model may categorize the transactions and/or generate an output to determine whether a transaction may be a subscription-based transaction. There may be cases that a financial institution receives transaction data between a small business merchant and a vendor for a first time. For example, the financial institution may receive for the first time, transaction data related to a new transaction that a first small business merchant M, that deals in e-commerce, may make a payment of X amount to a software vendor (e.g., Salesforce®). The first machine learning model may examine the transaction data (such as a transaction amount, transaction timestamp, a first identifier of merchant M (i.e., who is making the payment), and/or a second identifier of the software vendor (i.e., who is receiving the payment)) and the enterprise merchant insights information (such as the MCC indicating merchant M is in the e-commerce space). The first machine learning model may also examine the transaction data related to previous transactions between other small business merchants and the software vendor, particularly transactions that have amounts similar to X that were made to the software vendor, and merchants that are in the e-commerce space that have revenues comparable to that of merchant M. Based on the relevant transaction data and/or enterprise merchant insights information, the first machine learning model may determine whether the payment from merchant M to the software vendor, in the amount of X, may be related to a subscription-based service provided by the software vendor.

At step 316, an average contractual term (e.g., price, renewal rate, length, etc.) and/or a confidence score may be determined using a second machine learning model. An average contractual term associated with a first service of the one or more services provided by the software vendor may be generated using the second machine learning model. Similarly, a confidence score associated with the average contract price may be generated using the second machine learning model. The second machine learning model may be a supervised machine learning model, or an unsupervised machine learning model. The second machine learning model may use the relevant recurring transactions and/or subscription-based transactions determined by the first machine learning model as an input. The recurring transactions and/or subscription-based transactions may serve as a knowledge base for the second machine learning model. The second machine learning model may provide an estimation on an average contractual term (e.g., rate) as an output, for example, based on the recurring transactions and/or subscription-based transactions. The average contractual term (e.g., rate) may be based on what comparable merchants paid for similar software-based services. The second machine learning model may determine several average contractual terms, each with a corresponding confidence score.

The second machine learning model may use additional factors, such as an average duration of the contracts in a same merchant category and/or other detailed contract terms, as inputs. For example, the second machine learning model may receive, from a particular merchant, an input comprising a contract term length. The second machine learning model may determine an average contractual term (e.g., rate) based on the contract term length.

If the financial institution has access to actual receipts of transactions, the second machine learning model may access date parameters, key words (monthly, quarterly, annually) of the contracts, etc. If the financial institution has access to emails related to the contracts, the second machine learning model may have access to contract terms, for example, a usage plan of 2 GB per month or 4 GB per month. For example, the financial institution may partner with a web-based email service or a data gathered via an API from a third party. The financial institution may parse the information to obtain contract terms related to the recurring transactions and/or subscription-based transactions. In situations that small business merchants may not be willing to share the actual receipts or provide access to emails, the financial institution may use the transaction data and/or enterprise merchant insights information to determine the average contractual terms (e.g., rates) without compromising the privacies of the small business merchants.

The second machine learning model may generate an output customized to a particular small business merchant. The second machine learning model may predict a growth rate in an average contractual term (e.g., price) associated with a particular service used by the particular small business merchant. The second machine learning model may determine the renewal rate based on the average contractual term (e.g., price) and/or the predicted growth rate. For example, based on revenues of the small business merchants and/or the relevant transaction records, the second machine learning model may determine a growth rate at which the average contractual term (e.g., price) may be growing for similar services used by small business merchants with comparable revenues. The second machine learning model may predict how much usage of the services by the small business merchants and how the average contract rates may grow over time. For example, an online small merchant business in the e-commerce space may need more data processing power than an automobile part distributor who has a physical store. As such, the prediction may be tailored to the needs of the specific small business merchants.

At step 318, a recommendation comprising a renewal term (e.g., price) may be generated, for example, based on the confidence score associated with the average contractual term (e.g., price) exceeding a threshold value. For example, the second machine learning model may generate a plurality of average contractual terms (e.g., prices). One or more of the average contractual terms (e.g., prices) may be associated with a confidence score exceeding a threshold value, for example, 90%. The prediction server may select the average contractual term (e.g., price) with the highest confidence score as the renewal rate. The prediction server may select several average contractual terms (e.g., prices) with confidence scores that exceed one or more threshold values. The different renewal terms may be associated with different contract durations, usages, and/or other contract terms. The small business merchants receiving the renewal terms may select a particular term based on their preferences. For example, the recommendation may include an invoice schedule (e.g., a payment of one lump sum upfront or a schedule breaking out into quarterly/monthly payments). The small business merchants may select an invoice schedule based on their preferences.

At step 320, an alert for renewal and/or a recommended renewal term (e.g., price) may be sent to a particular merchant. Based on a determination that the first service provided by the software vendor is coming due for renewal, the prediction server may send an alert, such as via an email, electronic message through a web interface, a text message, etc. For example, the prediction server may monitor one or more software subscriptions associated with the small business merchants, and send the alert when the subscription may be coming due for renewal. The alert may include a recommended renewal term and/or the contract terms for renewal. For example, the prediction server may determine the growth trajectory and/or the potential new services that may benefit the small business merchant, and recommend a renewal term. For example, the prediction server may determine a particular small business merchant may be paying a higher rate than its peers, and recommend a renewal rate for the small business merchant to negotiate with the software vendor. The prediction server may also recommend alternative vendors that may provide similar services, and the recommended renewal terms to negotiate with each of the software vendors. The prediction server may display a dashboard on the merchant device that may display the recommended renewal terms, such as a recommended renewal rate. The dashboard may also provide a visualization of changes on, for example, the recommended renewal rate and invoice schedule over time.

Figure 4:
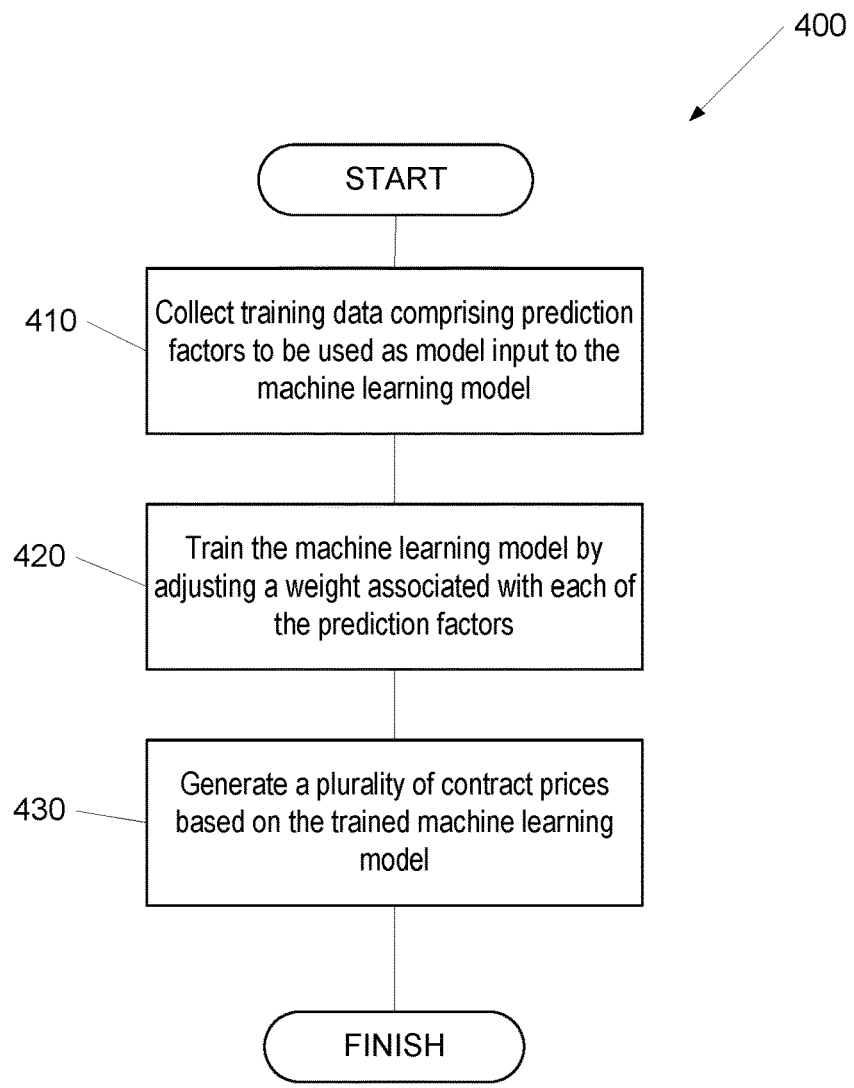
FIG. 4 shows a flow chart of a process of training a machine learning model to predict terms associated with SaaS offerings and/or other subscription-based software according to one or more aspects of the disclosure.

FIG. 4 shows a flow chart of a process of training a machine learning model for predicting contractual terms associated with SaaS offerings and/or other subscription-based software according to one or more aspects of the disclosure. Some or all of the steps of process 400 may be performed using one or more computing devices as described herein.

At step 410, training data, comprising prediction factors to be used as model input to a machine learning model, may be collected. For example, the training data may be used as a model input to a second machine learning model. The prediction factors may include merchant factors, such as a merchant size, a merchant location, a merchant industry (e.g., as indicated by the MCC), and the like. The prediction factors may also include transaction factors, such as a transaction amount and/or a frequency of payment. Additionally, the prediction factors may include vendor factors, such as a vendor size, a vendor location, a type of subscription-based software service provided by the vendor, etc.

At step 420, the machine learning model may be trained by adjusting a weight associated with each of the prediction factors. The second machine learning model may generate a plurality of contractual terms (e.g., prices) based on the training data, and each of the plurality of contract prices may be associated with a confidence score. The second machine learning model may determine whether the confidence score exceeds a threshold value. If the confidence score exceeds a threshold value, the second machine learning model may identify a set of prediction factors and/or their corresponding weights as appropriate model parameters for the trained model.

At step 430, a plurality of contract prices may be generated based on the trained machine learning model. The trained second machine learning model may use the model parameters, including the prediction factors and their corresponding weights, to generate the contractual terms (e.g., prices). For example, for a particular small business merchant M, the second machine learning model may determine the contractual terms (e.g., prices) based on transactions having similar transaction amount and/or frequency of payments, originating from merchants of similar size and/or in the same or similar merchant category or industries as merchant M. Additionally or alternatively, the second machine learning model may determine transactions related to payments to vendors of similar size, and/or vendors providing the same or similar type of services.

The prediction system may use machine learning model to identify recurring payments and/or determine an average contractual term (e.g., price) for a service provided by a software vendor. Rather than relying on the small business merchants to spend enormous computing resources to keep track of actual or projected usage of the software-based service, prediction system may provide reference points to small business merchants to facilitate their contract negotiations with the vendor.

The above-described systems, devices, and methods may improve efficiency and accuracy for the servers to process big data to predict terms on subscription-based software. In particular, the techniques described herein may prevent the servers to consume excessive computing resources to monitor the transactions, users, events, processors, usages or growth trends related to SaaS offerings and other subscription-based software. These techniques can be accomplished using machine learning model to analyze big data.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method comprising:

receiving, by a first computing device, small business transaction data in a first data format comprising payment information between a plurality of merchants and a software vendor, wherein the small business transaction data comprises a transaction amount, a transaction time and a first merchant identifier;

receiving, from a second computing device, enterprise merchant insights information in a second data format, wherein the enterprise merchant insights information comprises a second merchant identifier, a merchant name and a merchant category code;

converting the small business transaction data and the enterprise merchant insights information into a common data format;

identifying, based on a matching of the first merchant identifier with the second merchant identifier, the small business transaction data in the common data format, based on the enterprise merchant insights information in the common data format, and using a first machine learning model, recurring transaction records associated with a purchase of one or more services from the software vendor, wherein the recurring transaction records comprise the transaction amount, the transaction time, the merchant name and the merchant category code;

training, based on training data, a second machine learning model to determine predicted contract prices, wherein the trained second machine learning model assigns a weight factor to each of input to the second machine learning model, and wherein the training data comprises:
 a merchant size, a merchant location, a training merchant category code indicating an industry associated with each of training merchants;
 an amount and a frequency of payment associated with each of training recurrent transactions; and
 a vendor size, a vendor location and a type of subscription-based service provided by each of training vendors;

providing, as the input to the trained second machine learning model, first recurring transaction records associated with a first service of the one or more services provided by the software vendor, wherein the first recurring transaction records comprise a transaction amount, a transaction time, a merchant name and a merchant category code associated with the first service, and wherein the merchant category code indicative of a merchant industry of the first service is assigned a greater weight factor than other input in the trained second machine learning model;

receiving, based on the first recurring transaction records and the weight factor of each of the input, and as output from the trained second machine learning model, an average contract price associated with the first service provided by the software vendor, and a confidence score associated with the average contract price;

generating, based on the average contract price and the confidence score exceeding a threshold value, a recommendation comprising a renewal rate associated with the merchant industry; and based on a determination that the first service provided by the software vendor is coming due for renewal, sending, to a particular merchant, an alert associated with the renewal, wherein the alert comprises the recommendation.

2. The computer-implemented method of claim 1, further comprising:
 receiving, from the particular merchant, an input comprising a contract term length, wherein the recommendation is further based on the contract term length; and
 generating the recommendation further comprises the contract term length.

3. The computer-implemented method of claim 1, wherein the common data format comprises a JavaScript Object Notation (JSON) format and an Extensible Markup Language (XML) format.

4. The computer-implemented method of claim 1, wherein the first data format comprises a text format, and the second data format comprises unstructured data format.

5. The computer-implemented method of claim 1, wherein the first machine learning model and the second machine learning model each comprises a supervised machine learning model.

6. The computer-implemented method of claim 1, further comprising:
 predicting, using the trained second machine learning model, a growth rate in the average contract price associated with the first service; and
 based on the average contract price and the predicted growth rate, generating the recommendation comprising the renewal rate.

7. The computer-implemented method of claim 1, wherein training the second machine learning model comprises:
 assigning a first set of weight factors for prediction factors in the input;
 determining, using the second machine learning model and based on the first set of weight factors, a first contract price associated with a particular service and a first confidence score associated with the first contract price;
 assigning a second set of weight factors for the of prediction factors in the input;
 determining, using the second machine learning model and based on the second set of weight factors, a second contract price associated with the particular service and a second confidence score associated with the second contract price;
 based on a comparison of the first confidence score and the second confidence score, selecting the first set of weight factors or the second set of weight factors as weight factors for the trained second machine learning model.

8. The computer-implemented method of claim 7, wherein the prediction factors comprise merchant factors comprising:
 the merchant size, the merchant location and the merchant category code indicative of the merchant industry.

9. The computer-implemented method of claim 8, wherein the prediction factors comprise transaction factors comprising:
 the transaction amount and the frequency of payment.

10. The computer-implemented method of claim 8, wherein the prediction factors comprise vendor factors comprising:
 the vendor size, the vendor location and the type of subscription-based service.

11. The computer-implemented method of claim 1, further comprising:
 causing, by the first computing device, a user interface to be displayed on the second computing device;

receiving, from the second computing device, labeled transaction data indicating whether a particular transaction is a subscription-based service, a contract price, a contract duration and one or more contract terms, a type of service of the particular transaction;

wherein identifying the recurring transaction records comprises:

training the first machine learning model based on second training data comprising the labeled transaction data;

providing, as input to trained first machine learning model, the small business transaction data and the enterprise merchant insights information; and receiving, as output from the trained first machine leaning model, the recurring transaction records.

12. A prediction system comprising:

one or more processors; and memory storing instructions that, when executed by the one or more processors, cause the prediction system to:

receive small business transaction data in a first data format comprising payment information between a plurality of merchants and a software vendor, wherein the small business transaction data comprises a transaction amount, a transaction time and a first merchant identifier;

receive, from a computing device, enterprise merchant insights information in a second data format, wherein the enterprise merchant insights information comprises a second merchant identifier, a merchant name and a merchant category code;

converting the small business transaction data and the enterprise merchant insights information into a common data format;

train a first machine learning model to adjust a weight on each of input factors;

identify, based on the small business transaction data in the common data format, based on the enterprise merchant insights information in the common data format, and using the trained first machine learning model, recurring transaction records associated with purchase of one or more services from the software vendor;

train, based on training data, a second machine learning model to adjust a weight on each of prediction factors in an input to the second machine learning model, wherein the training data comprises:

a merchant size, a merchant location, and a training merchant category code indicating an industry associated with each of training merchants;

an amount and a frequency of payment associated with each recurrent training transaction; and a vendor size, a vendor location, and a type of subscription-based service provided by each of training vendors;

providing, as input to the trained second machine learning model, first recurring transaction records associated with a first service of the one or more services provided by the software vendor, wherein the first recurring transaction records comprise a transaction amount, a transaction time, a merchant name and a merchant category code associated with the first service, and wherein the merchant category code indicative of the merchant industry of the first service is assigned a greater weight factor than other prediction factors in the input of the trained second machine learning model;

receive, based on the first recurring transaction record and as output from the trained second machine learning model, an average contract price associated with the first service provided by the software vendor, and a confidence score associated with the average contract price;

generate, based on the average contract price and the confidence score exceeding a threshold value, a recommendation comprising a renewal rate associated with the merchant industry; and based on a determination that the first service provided by the software vendor is coming due for a renewal, send, to a particular merchant, an alert associated with the renewal, wherein the alert comprises the recommendation.

13. The prediction system of claim 12, wherein the common data format comprises a JavaScript Object Notation (JSON) format and an Extensible Markup Language (XML) format.

14. The prediction system of claim 13, wherein the first data format comprises unstructured data format, and the second data format comprises a text format.

15. The prediction system of claim 12, wherein the first machine learning model and the second machine learning model comprises a unsupervised machine learning model or a back propagation model.

16. The prediction system of claim 12, the instructions cause the prediction system to:

predict, using the trained second machine learning model, a growth rate in the average contract price associated with the first service; and generate, based on the growth rate, the recommendation comprising the renewal rate.

17. The prediction system of claim 12, the instructions cause the prediction system to train the second machine learning model by:

assigning a first set of weight factors for prediction factors in the input;

determining, using the second machine learning model and based on the first set of weight factors, a first contract price associated with a particular service and a first confidence score associated with the first contract price;

assigning a second set of weight factors for the prediction factors in the input;

determining, using the second machine learning model and based on the second set of weight factors, a second contract price associated with the particular service and a second confidence score associated with the second contract price; and based on a comparison of the first confidence score and the second confidence score, selecting the first set of weight factors or the second set of weight factors as weight factors for the trained second machine learning model.

18. The prediction system of claim 17, wherein the prediction factors comprise at least one of:

the merchant size, the merchant location, the merchant industry, the transaction amount, the frequency of payment, the vendor size, the vendor location and the type of subscription-based service.

19. One or more non-transitory media storing instructions that, when executed by one or more processors, cause the one or more processors to perform steps comprising:

receiving, by a first computing device, small business transaction data in a first data format comprising payment information between a plurality of merchants and a software vendor, wherein the small business transaction data comprises a transaction amount, a transaction time and a first merchant identifier;

receiving, from a second computing device, enterprise merchant insights information in a second data format, wherein the enterprise merchant insights information comprises a second merchant identifier, a merchant name and a merchant category code;

converting the small business transaction data and the enterprise merchant insights information into a common data format;

training, by the first computing device, a first machine learning model to adjust a weight on each of input factors;

identifying, based on the small business transaction data in the common data format, based on the enterprise merchant insights information in the common data format, and using the trained first machine learning model, recurring transactions associated with purchase of one or more services from the software vendor;

training, by the first computing device and based on training data, a second machine learning model to adjust a weight factors on each of prediction factors, wherein the training data comprises:
 a merchant size, a merchant location, and a training merchant category code indicating an industry associated with each of training merchants;
 an amount and a frequency of payment associated with each recurrent training transaction; and
 a vendor size, a vendor location, and a type of subscription-based service provided by each of training vendors;

providing, as input to the trained second machine learning model, first recurring transaction records associated with a first service of the one or more services provided by the software vendor, wherein the first recurring transaction records comprise a transaction amount, a transaction time, a merchant name and a merchant category code associated with the first service, and wherein the merchant category code indicative of the merchant industry of the first service is assigned a greater weight factor than other prediction factors in the input of the trained second machine learning model;

receiving, based on the first recurring transaction records, as output from the trained second machine learning model, an average contract price associated with the first service provided by the software vendor, and a confidence score associated with the average contract price;

generate, based on the average contract price and the confidence score exceeding a threshold value, a recommendation comprising a renewal rate associated with the merchant industry; and based on a determination that the first service provided by the software vendor is coming due for a renewal, send, to a particular merchant, an alert associated with the renewal, wherein the alert comprises the recommendation.

20. The non-transitory media of claim 19, wherein the common data format comprises a JavaScript Object Notation (JSON) format and an Extensible Markup Language (XML) format.

21. The non-transitory media of claim 20, wherein the first data format comprises a text format, and the second data format comprises unstructured data format.

* * * * *